Aug. 7, 1928.

E. M. BROGDEN 1,680,260

FRUIT TREATING APPARATUS

Filed Nov. 26, 1921

Inventor
Ernest M. Brogden

Patented Aug. 7, 1928.

1,680,260

UNITED STATES PATENT OFFICE.

ERNEST M. BROGDEN, OF WINTER HAVEN, FLORIDA, ASSIGNOR TO BROGDEX COMPANY, OF WINTER HAVEN, FLORIDA, A CORPORATION OF FLORIDA.

FRUIT-TREATING APPARATUS.

Application filed November 26, 1921. Serial No. 518,033.

This invention relates to fruit treating apparatus; and it relates more particularly to apparatus for preparing for market fresh fruit that is natually of such perishable character as to require special treatment in order to ensure its reaching the consumer in sound and readily salable condition. The apparatus of the invention is especially useful for the treatment of oranges, grapefruit, and other citrus fruits which, as is well known, must be handled, packed and shipped with great care if they are to reach the consumer in good condition; and accordingly, in explaining the principles of the invention, reference will be made, for the sake of a concrete illustrative example, to novel apparatus that has proved successful in treating citrus fruit on a large scale.

I have discovered that by properly applying to citrus fruit a mixture of a sealing and waterproofing material, such as paraffin, with a liquid vehicle, such as gasolene, the fruit may be provided with a very thin but continuous coating that protects it against rotting, prevents it from withering, and in general maintains its original appearance, soundness, freshness and flavor. The apparatus of the present invention enables this treatment to be carried out in a simple, economical and effective manner.

Figure 1:
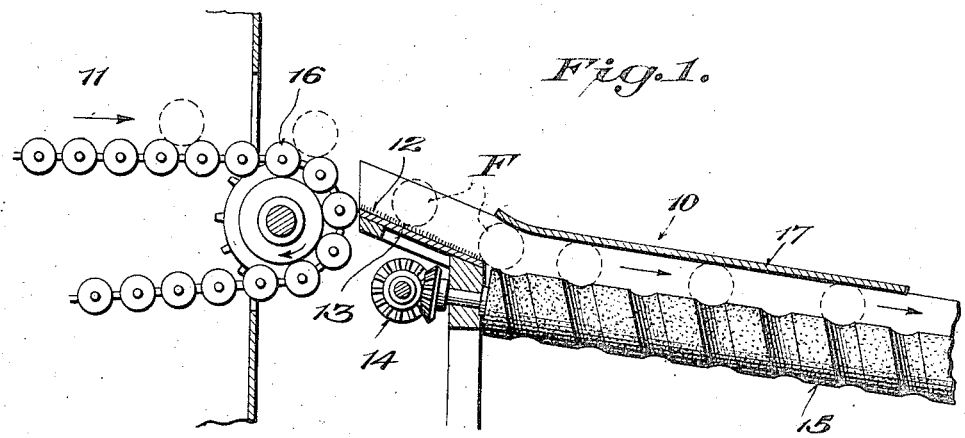
Figure 2:
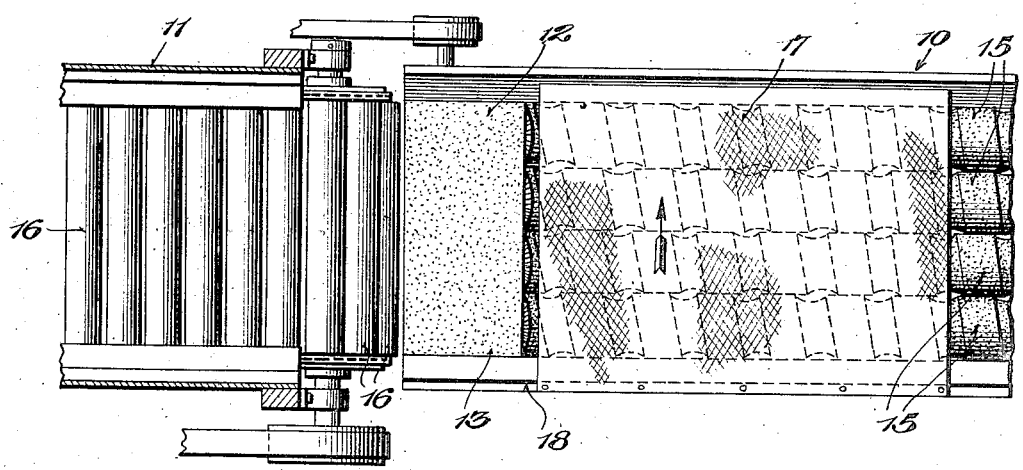

Broadly speaking, the novel apparatus comprises means of some description for brushing or otherwise rubbing the surface of the fruit, in combination with cooperating means for supplying a spreadable protective material such, for example, as a coating composition of the character described in such manner that it may be uniformly distributed by the brushing or rubbing means in proper quantity as a relatively thin coating or film of the proper character over the fruit. Within the broad scope of the invention, various types of apparatus can be constructed to carry out the described treatment or handling of fruit. Some constructions involve only slight change in or addition to existing apparatus which was, however, incapable of functioning in accordance with my invention prior to such change or addition; while other constructions involve more radical departure from prior practice. The underlying principles of the invention can be readily understood from the description hereinafter of a typical embodiment in which said principles are incorporated in a form that has not only been found to work satisfactorily in actual practice, but that has the further advantage of utilizing standard fruit handling machinery with only relatively slight alteration to confer upon it the novel capability here in question. Such a typical embodiment is illustrated in the accompanying drawings wherein Fig. 1 is a side elevation, partly broken away and in section, of one form the apparatus may take; and Fig. 2 is a top plan view of the same.

In the embodiment of the invention illustrated in the drawings, 10 designates generally a fruit brushing or polishing device or machine of any suitable character, the particular device or mechanism here shown being what is known in the fruit-packing industry as the Stebler-Parker type of fruit polisher. At 11 is indicated generally a fruit dryer of a type commonly preceding the polisher in the series of machines constituting a usual type of packing house installation.

According to the practice prevailing prior to my invention, oranges or other citrus fruit, previously washed in water, and then dried, in the dryer, passed without other treatment directly to the polisher, from which they were discharged to the usual grading and sizing machinery.

In the practice of my invention I provide means for supplying a non-solid or semi-fluid coating material, such as a suitable mixture of paraffin and gasolene, to the fruit to be polished, so that the brushes or rolls of the polisher can act to spread the coating material over the fruit in proper quantity as it passes over them. Broadly speaking, the means for so supplying the specified coating material may take any form suitable for the particular purposes in view. In the present example, a strip 12 of yielding material, preferably absorptive, such as a heavy woven fabric, constitutes such means, said strip being suitably secured in place on the sloping chute board 13 that covers the driving gears 14 for the inclined polisher rolls 15 and provides a bridge over which the fruit F, after being discharged from endless conveyor 16, rolls on its way from the dryer to the polisher. The conveyor and chute board thus cooperate in feeding or delivering fruit to said rolls. In employing the apparatus, a mass of the specified coating material is from time to time placed upon the strip 12 by hand or in any other convenient manner and is spread over said strip which thus holds the material in place as a source of supply disposed in the line of travel of the fruit. A small quantity is readily given up to each fruit as it rolls over and across the strip to the polisher. This small quantity of coating material is then rubbed all over the fruit by the yielding bristles of the polishing rolls as the fruit passes down along the rolls, and any surplus beyond what is needed to provide the proper coating is removed by the action of the brushes.

In order to ensure turning the orange over and over in all directions as it goes through the polisher, and thus obtaining thorough and uniform distribution of the coating material over the fruit, I provide means arranged to yieldingly engage the upper surface of the fruit frictionally as it travels along the polishing rolls, and thus cause it to turn as specified. In the case of the polisher here illustrated, the parallel rolls 15, all rotate in the same general direction indicated in Fig. 2 by the arrow extending transversely of the polisher. By providing a blanket 17, or the like, secured along one edge to the side member 18 of the polisher, so that it overlies a substantial portion of the polisher rolls, the rotation of the rolls, tending to move the blanket in the direction of the arrow, keeps the blanket spread across the rolls and upon the fruit moving along on the rolls and underneath the blanket. This provides the frictional or braking action on the upper side of the fruit requisite to bring about rolling of the fruit transversely as well as longitudinally of the polisher, which results in the desired thorough spreading of the coating material by the brushing or rubbing action of the rolls and blanket combined.

The inclination of the polisher rolls toward the point of discharge may be half an inch to an inch per foot to length; and accordingly they may be said to be in an approximately horizontal plane. In order to secure the best coating effect, it is necessary to properly regulate the surface speed of the rolls. Using, for instance, a semi-fluid or pasty mixture consisting of about 60 parts of paraffin and 40 parts of gasolene, by volume, and employing polishing rolls having a diameter of 8 inches, the rolls should be run at about 135 R. P. M. At this speed a thin continuous paraffin coating of the proper character is obtained on the fruit, any excess coating material being removed by the brushes. The desirability of maintaining this optimum surface speed of the polisher rolls sometimes necessitates altering the gear ratio at which the rolls were driven when the polisher was used in the way it was originally intended to operate.

What I claim is:

1. Fruit treating apparatus comprising the combination, with fruit brushing or polishing means, and means for feeding fruit thereto, of yielding means for supplying a semi-fluid or pasty composition to the fruit substantially as it is being fed to said brushing and polishing means.

2. Fruit treating apparatus comprising the combination, with parallel inclined fruit-polishing rolls, of means for feeding fruit to said rolls near their upper ends, and composition-applying means arranged in the path of travel of the fruit and disposed between such feeding means and said rolls, said fruit being compelled to roll across said composition-applying means on its way to said rolls.

3. Fruit treating apparatus as set forth in claim 2, wherein said composition-applying means comprises a strip of textile material.

4. Fruit treating apparatus comprising the combination, with a fruit polisher and a dryer discharging thereto, of means interposed between said dryer and polisher for applying to the fruit a coating composition.

5. Fruit treating apparatus comprising the combination, with a plurality of parallel closely adjacent polishing rolls rotating in the same direction on their respective longitudinal axes, which axes are substantially in the same approximately horizontal plane, of yielding means arranged to overlie said rolls and to frictionally engage fruit passing along said rolls, means arranged to deliver fruit to said rolls between their upper surface and said yielding means, and material holding means adjacent said rolls for supplying protective material to fruit near where it is delivered to said rolls.

6. Fruit treating apparatus as set forth in claim 5, wherein said rolls are inclined toward a point of discharge, and said yielding means is constituted by a blanket-like device.

7. Apparatus for applying protective material to fruit which comprises the combination, with cooperating inclined parallel rotary brush rolls, of means for supplying protective material to fruit to be treated by said rolls, and yielding means superimposed upon said brush rolls to frictionally engage fruit treated thereby.

8. Apparatus as set forth in claim 7, wherein said yielding means comprises a blanket-like member.

In testimony whereof I hereunto affix my signature.

ERNEST M. BROGDEN